United States Patent
La Due

(10) Patent No.: US 8,570,923 B2
(45) Date of Patent: Oct. 29, 2013

(54) RESONANT COMMUNICATIONS TRANSCEIVER METHOD AND APPARATUS

(75) Inventor: Christoph Karl La Due, Talent, OR (US)

(73) Assignee: Holophasec Pty. Ltd., Wilmington, DE (US)

( * ) Notice: Subject to any disclaimer, the term of this patent is extended or adjusted under 35 U.S.C. 154(b) by 265 days.

(21) Appl. No.: 13/109,882

(22) Filed: May 17, 2011

(65) Prior Publication Data

US 2012/0269105 A1 Oct. 25, 2012

Related U.S. Application Data

(60) Provisional application No. 61/477,556, filed on Apr. 20, 2011.

(51) Int. Cl.
 *H04J 13/10* (2011.01)
(52) U.S. Cl.
 USPC .......................................... 370/310
(58) Field of Classification Search
 USPC .......................................... 370/310
 See application file for complete search history.

(56) References Cited

U.S. PATENT DOCUMENTS

| | | | | |
|---|---|---|---|---|
| 5,407,524 | A | * | 4/1995 | Patrick et al. .................... 216/59 |
| 2006/0233123 | A1 | * | 10/2006 | Lee ................................ 370/295 |
| 2006/0262876 | A1 | * | 11/2006 | LaDue ........................... 375/295 |
| 2009/0195366 | A1 | | 8/2009 | Meier |
| 2010/0264748 | A1 | | 10/2010 | Tucker |
| 2010/0277005 | A1 | | 11/2010 | Karalis et al. |
| 2010/0328045 | A1 | | 12/2010 | Goto et al. |

OTHER PUBLICATIONS

International Search Report and Written Opinion for International Patent Application No. PCT/US2012/034585, Mailed Jun. 22, 2012, 10 pages.

* cited by examiner

*Primary Examiner* — Sulaiman Nooristany
(74) *Attorney, Agent, or Firm* — Blakely, Sokoloff, Taylor & Zafman, LLP

(57) ABSTRACT

A communications infrastructure, comprising an energy transfer medium transmitting a sine wave of a first frequency. A first coil is placed proximate the energy transfer medium and a power source coupled to the first coil selectively charges the first coil with a first voltage of a first polarity in a first instance and then selectively charges the first coil with a second voltage of opposite polarity in a second instance to generate a first three dimensional spatial fractalized voltage sample. The first sample is mapped to a symbol of a set of symbols and coded into the sine wave by virtue of the first coil being proximate the energy transfer medium.

4 Claims, 9 Drawing Sheets

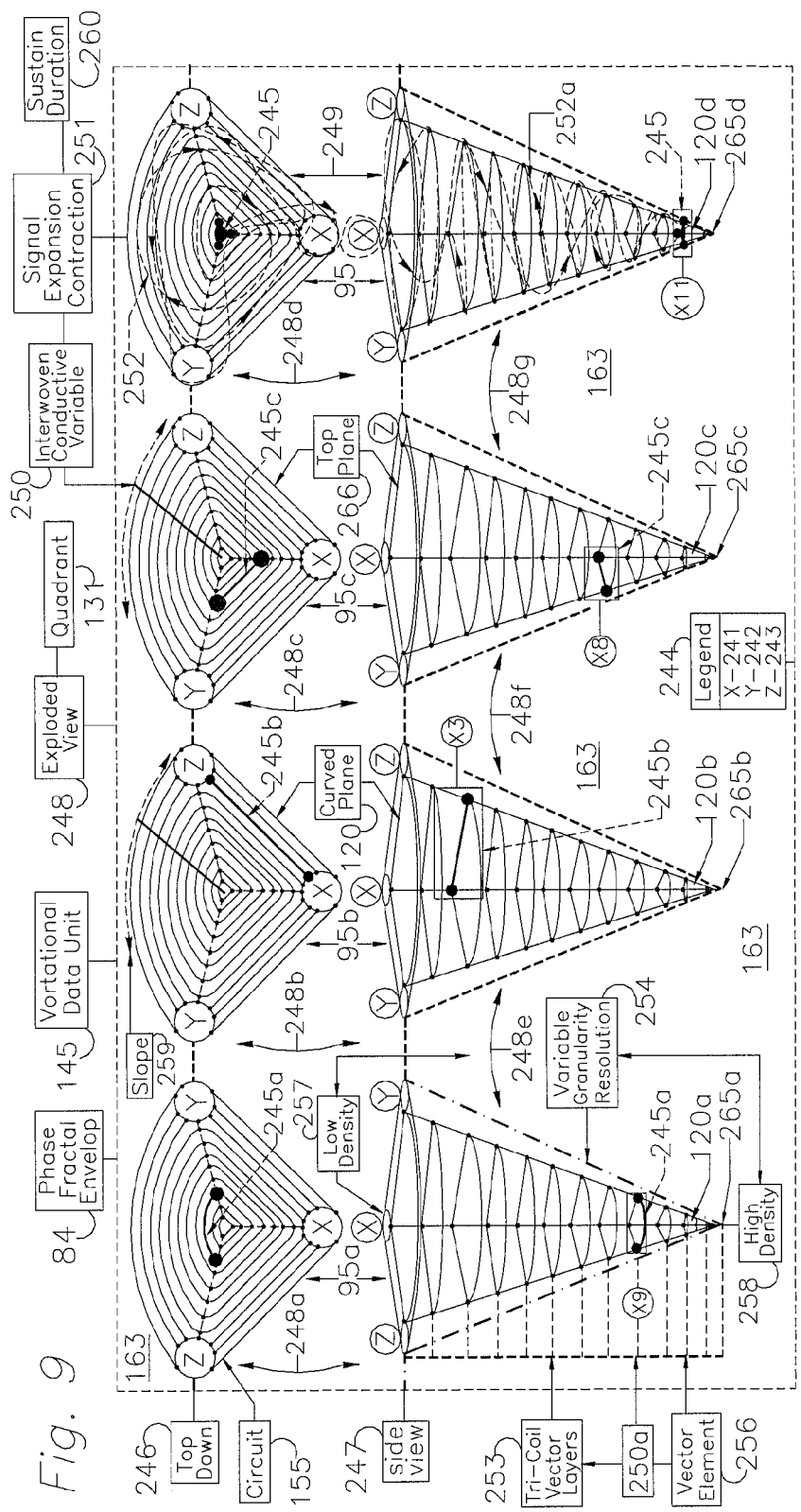

RESONANT COMMUNICATIONS TRANSCEIVER METHOD AND APPARATUS

PRIORITY

This U.S. Patent application claims priority to U.S. Provisional Patent application No. 61/477,556 filed Apr. 20, 2011.

BACKGROUND OF THE INVENTION

1. Field of the Invention

An embodiment of the invention relates to data and voice communication devices and communication network protocols, processes, and procedures. An embodiment of the invention introduces a novel resonant vortational modulation method that can be applied for the purpose of dramatically improved data throughput rates, data security, and data protocol diversity over existing electrical power grids and radio and television channel networks without use of dangerous high frequencies. Data throughput rates are increased in target telecommunications networks without the use of inefficient digital data compression. An embodiment of the invention can be applied to terrestrial telecommunications, common carrier channels, satellite telecommunications and satellite television channels.

2. Description of Related Art

The advance of telecommunications networks over the past two hundred years has been fundamentally guided by a set of constrained parameters that ignores the complex inter-relationships that define the way that Nature does business. Nature uses complex relationships among a large variety of simple processes to do effortlessly what Science requires the application of brute force and gross inefficiency to perform. Recent work in the design discipline of Biomimicry shows promise in reversing this trend to a small degree, but this new science is in its infancy. The conventional world of science and engineering has a long way to go to incorporate nature's synergistic principles. Contemporary telecommunications technology exhibits many examples of the limitations imposed by centuries of ignoring Nature's way of doing business. Embodiments of the invention provide a way of moving forward and beyond these limitations to a means of information transfer that is far more in alignment with Natural systems.

Claude Chappe invented the non-electric telegraph in 1794. This system used semaphore, a flag-based symbolic alphabet, to transmit symbols via line-of-sight communication. By definition, the network was limited to one data stream at a time over a single "conductor", in this case the conductor being a visual path from one telegraph station to the next. With the primitive technology available in the $18^{th}$ century, it was logical for one operator to receive a single stream of semaphored symbolic data from a transmitting telegraph station on a remote hillside and pass it on to the next hillside station.

A consensus model was established that carries through to this day: It is presumed that one conductor may carry one and only one electromagnetic communicative stream at a time. With very few exceptions, this is considered to be a basic principle framed by the fundamental principles of physics. Every element of contemporary telecommunications network theory and practice is derived from this consensus model.

The model posits that the physical propagation of communications data over any typical medium such as twisted wire pairs or a radio frequency link may be completely described by defining only two dimensions. For an electromagnetic communicative act, established models as defined by contemporary physics declare that amplitude and frequency are the two dimensions that completely define a waveform propagated over a given transmission medium. And given these restrictions, this communicative act is limited "by definition" to propagating a single waveform over a single physical element of transmission medium. This waveform might be exceedingly complex in both time and frequency domains, but it is only possible for one waveform to occupy the physical space of the medial physical element at any given moment.

The "one waveform/one carrier" paradigm described above establishes the serial data stream transmission as the predominant master protocol of record. Given this dominant position, three means have become established as the way to achieve higher data density and increased transmission rate. These are data multiplexing, data compression, and increasing the carrier frequency.

From the earliest days of telegraphy, researchers have found ways to increase data density by time-domain multiplexing several data streams together. In this process, standard-length packets of information from numerous discrete data streams are encoded for identification, then combined in such a way that the multiple data streams may be separated out once again at the receiving end. In today's telecommunication world, TDMA, CDMA, and OFDM describe various means for combining multiple streams for serial transmission via conventional physical media. Satcom and Ethernet networks routinely use these approaches to merge a large number of low-data-rate data streams and propagate them using a finite number of media conduits.

Mathematic modeling has provided a number of ways to compress data by modeling what portion of a data stream might be redundant, removed without significantly compromising data integrity, or simply serving as a place-keeper, and removing that portion before transmission. The result can be a significant increase in transmitted data density. In digital voice channels for example, vocoder technology can provide an 8:1 data compression factor. This technique is based upon a model of the human vocal tract, creating a small library of phonemes, or archetypical vocal sounds. A simple code value is assigned to each phoneme. An incoming speech sample is analyzed and broken down into its phoneme content. The codes are then transmitted instead of the actual speech data. At the receiving end, the phoneme codes are used to drive a synthesizer, reconstituting a facsimile of the original speech samples.

In recent history, the demands of cell phone and internet usage have placed rapidly increasing demands upon network capacity. A third response strategy is to move carrier frequencies up the spectrum to previously unexploited bands. Tightly modulated, compressed, and multiplexed digital data streams can take up very little bandwidth, often as little as 10 kHz bandwidth for a voice or data channel. Transitioning from megahertz to gigahertz frequency bands means that the number of possible data channels may be increased by a factor of at least 1000. One hundred 10 kHz channels might be possible at a carrier frequency in the 1 megahertz range; One hundred thousand channels of the same bandwidth are possible at 1 gigahertz.

In the 1980's, microwave publications routinely speculated as to whether there would ever be a large consumer market for exotic, high-frequency RF hardware. The pressures of massive consumer electronics data traffic have forced the issue. It is now commonplace for us to have cell phones operating at 800 MHz, wireless home and office networks at 2.4 GHZ, and wireless telephone service at 4.2 MHz. Many in the industry have shared concern over the widespread use of these high frequency carriers. It is a highly charged political issue, as commercial interests are balanced against public safety. Contemporary epidemiological studies seem to indicate that long term exposure to these carriers imposes long term health risks, especially to our young. We remain addicted to our cell phones and Internet links; reducing demand would not seem to be an alternative. Exploitation of the dominant "one waveform/one carrier" paradigm appears to be reaching its logical and practical limit.

An embodiment of the invention, referred to herein as a Resonant Vortational Division Multiplex (RVDM) method, offers a practical and healthy alternative to the dominant paradigm. It can be introduced into existing networks in a non disruptive manner, providing a practical means for continuing trends toward higher data density and rates, without the concomitant risks to human health posed by the dominant monotonic paradigm.

SUMMARY OF THE INVENTION

The invention introduces the concept of phase as an offset parameter that equates to a segment of channel space in a communications network. Unlike conventional single-conduit conceptualizations of network channel space, in a defined channel space based on Resonant Vortational Division Multiplex (RVDM), many data streams coexist in such a way that no data stream interferes with any other data stream. The RVDM modulation approach utilizes a resonant vortational digital data encoding and decoding method that can be used in existing wireless or wired channels, including but not limited to those channel structures found in all forms of mobile radio, satellite telecommunication networks, telecommunications specific twisted pair, high speed coaxial network media. The invention is also applicable as a means to convey large amounts of data over electrical power grids in a manner unrestrained by grid transformers, shunts, line capacitance and the like. Embodiments of the Resonant Vortational Divisional Multiplex (RVDM) modulation method result in a significant increase in the amount of data that can be propagated through an existing channel space, without requiring the use of conventional multiplexing or compression schemes.

BRIEF DESCRIPTION OF THE DRAWINGS

FIG. 9 depicts the exploded view of the resonator quadrant and its four associated tri-coils, according to the invention.

DETAILED DESCRIPTION OF EMBODIMENTS OF THE INVENTION

Figure 1:
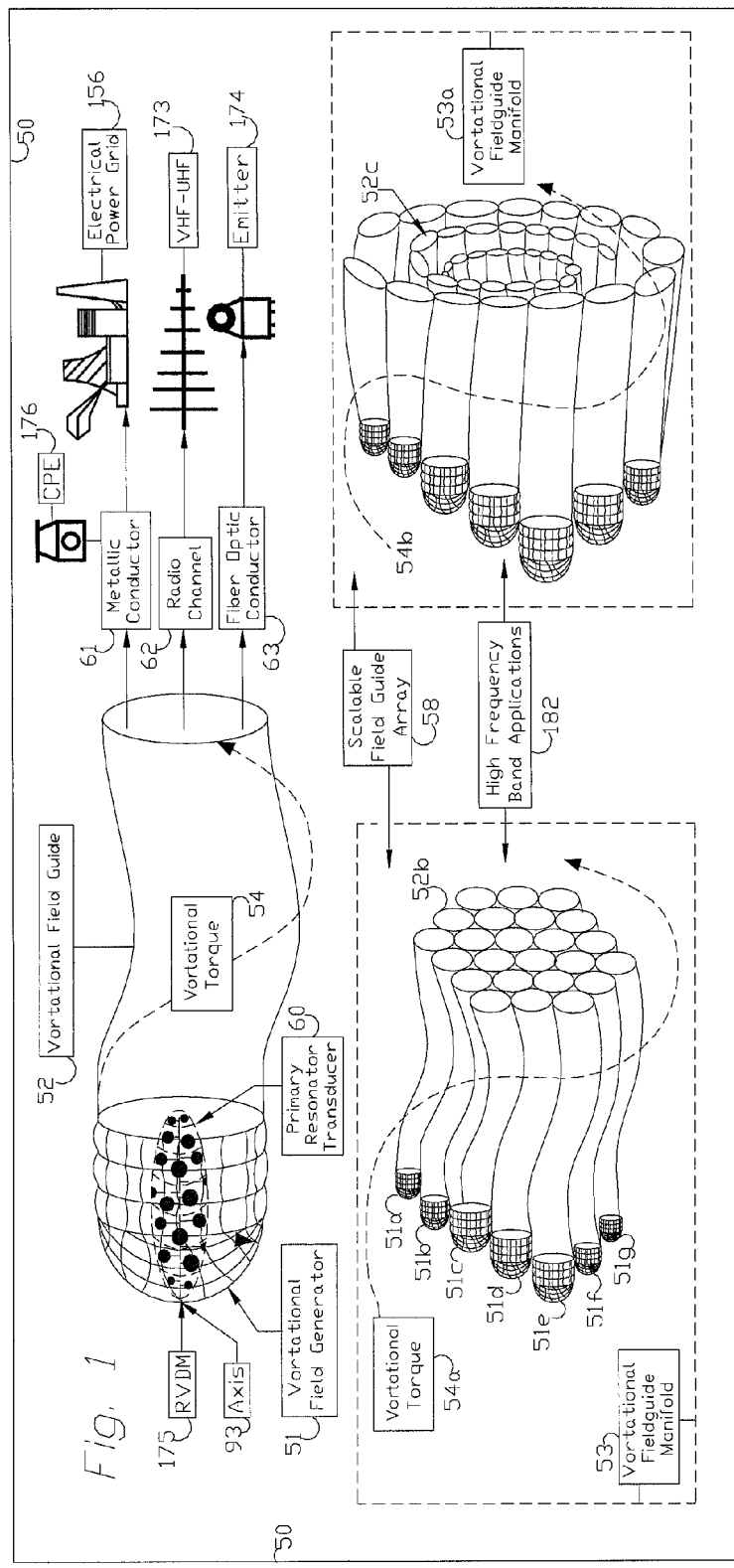
FIG. 1 depicts the fundamental component parts of the resonant field-channel guide manifold, and associated field-channel guides, according to the invention.

Embodiments of the invention's Resonant Vortational Division Multiplex (RVDM) is based upon the application of resonant digital data vector (RDDV) encoding and decoding that are mathematically defined in terms of fractalized data unit vector symbolic structures (VSS). One resonant digital data vector (RDDV) equates to one phase fractal envelop. One phase fractal envelop equates to one data byte-data unit. This same data vortational phase fractal envelop is easily trans-codable to any mathematical symbolic construct. The assigned value is completely arbitrary. Like Code Division Multiple Access (CDMA), the invention spreads and de-spreads its signal. However, this is where the similarity ends. According to an embodiment of the invention, the modulation method is not based upon the spreading and de-spreading of convolutional mathematical coding in order to create logical traffic channels in an assigned physical frequency domain and expand instant user load in full duplex channel. Embodiments of the invention are fully capable of adapting to conventional full duplex telecommunications channel communication methods.

Embodiments of invention's RVDM modulation approach utilize a resonant vortational digital data encoding and decoding method that can be used in wireless radio air-interface frequency assigned channels, which include all forms of mobile radio and satellite telecommunication networks. Embodiments of the invention's modulation method utilize a novel resonant vortational digital data encoding and decoding method that can also be used in metallic communication mediums, such as telecommunications specific twisted pair and electrical power conductors used in all electrical power grid networks. Further embodiments utilize a resonant vortational digital data encoding and decoding method that can also be used in all fiber optic networks.

The following steps describe how an embodiment of the invention performs a fundamental communicative act. In step (1), according to one embodiment, a resonant field transceiver receives a conventionally generated sine wave from a voltage source. A voltage source in this case is any electromagnetic energy that is transformed into a periodic sine wave and sent over any electromagnetic medium such as metallic conductor, radio channel, or an optical communications channel. In step (2), the sine wave is logically routed directly to a transducer resonator. Simultaneously in step (3), in a continuation of step two, the sine wave passes through the transducer resonator which operates as a resonant field generator to logically and physically energize each selected re-emitting resonator in specific sequences in order to initiate periodic vortational torque which defines a sustained torque path trajectory (a) from periodic resonant vortational digital data frames and sub-frames while (b) simultaneously forming the resonant digital alphabet that is retrieved from a stored alphabet template.

In step (4), a continuation of step three, the associated re-emitting resonator(s) are energized in sequences that match the associated carrier synchronization scheme and sustain the vortational signal torque in a synchronized pattern that correlates with the reference synchronization of the selected base carrier. In step (5), a periodic vortational spin is induced that (a) acts as the carrier signal modulating factor forming periodic spiral shaped sequences that contain the stabilized vortational data frames which (b) are algorithmically interpreted resonant fractalized vortational digital data shapes that are (c) resonant digital data words, and (d) resonant digital data units that can be (e) algorithmically cross correlated and (f) transcoded with standard digital data words, and (g) digital data unit samples that function as (h) telecommunication and (i) computational analogue and digital telecommunication networks, and internal binary bus logic communication data bytes.

In step (6), the modified sine wave is received, decoded and processed by another resonant communications transceiver and its associated field guide and field guide generator. In step (7), when the modified sine wave and its associated modified flux field are received, the data information is snap-shot-mirrored and stored by an associated data storage base. In step (8), the originating resonant communications transceiver immediately measures the received signal strength and signal data fragmentation levels, and continues the communicative act by transmitting more data samples and control information until in step (9), the data communication event is terminated. According to an embodiment of the invention, the resonant communication transceiver is comprised of one or a plurality of resonant field generators and field-channel guides that comprise resonant field-channel guide manifolds. In one application-specific configuration, the resonant communications transceiver may be comprised of standard off-the-shelf microprocessors, integrated circuits and bus-logic circuitry, well known to those who practice the art.

The invention generates resonant vortational digital data elements that can be coded to equate to a simple standard digital eight bit byte. Each eight bit byte octet corresponds with human machine interface characters that equate to full ASCII and other standard-English alphabets well known to those who practice the digital arts. There are more complex symbolic language sets, relating to ASCII and other common language sets is a straight forward way of illustrating the data unit correlations between a standard language set and a vortational data unit sample that is based upon a phase fractal envelop, according to one embodiment of the invention. Many types of digital applications use data variables that represent eight or fewer bits such as a truncated hexadecimal four bit byte that has been widely used in wireless mobile cellular control channels. However, this is where the similarity ends. Instead of counting bits that are derived from counting waveform peaks and troughs, the invention generates vortational digital data elements through encoding fractal-vectors by embedding a phase fractal envelop data sample into the waveform.

One embodiment of the invention provides variable ratio and scale aperture which is dependent upon the frequency band utilized. According to one embodiment of the invention, an alphabet character or vortational sample size is defined by the geometric coordinates of an application specific resonant generator form factor, and the vortationally relative position within a fractalized communications channel structure. Varying digital sample sizes have been shown to be an effective tool for supplying digital data characters in non-linear digital voice channels with memory. Digital sample alphabets with varied sample sizes for each alphanumeric character have shown to be effective in enabling digital data transmissions in band limited channels that suffer from extreme data compression. New alphabets with data characters that possess varied sample sizes can be applied to a channel that is used in mobile cellular communication environments that have different voice vocoder sampling rates. One alphabet can be used for one sampling rate such as half-rate vocoder setting and another alphabet for full-rate vocoder sampling rate. Embodiments of the invention dramatically extend this concept that is now well known in the telecommunications art.

Referring to FIG. 1, according to one embodiment of the invention, an electromagnetic vortational field guide generator 51 and associated vortational field guide(s) 52, 52*b* and 52*c* is depicted. Each vortational field generator 51 can be logically and physically interfaced with a metallic conductor (s) 61 such as a metallic electrical power conductor that is used to transport Resonant Vortational Division Multiplex (RDVM) 175 modulated electrical energy and data information over a selected conventional electrical power grid 156. In some cases the Electrical Power Industry has selected some new advanced hybrid composite electrical power conductors; an embodiment of the invention also can be applied to these new mediums. An embodiment of the invention is applicable to a wired telephony network. In a telephone network the metallic conductor is a twisted pair that delivers service to a customer premise equipment (CPE) 176 system such as Resonant Vortational Division Multiplex (RDVM) 175 enabled data modem. The vortational field generator 51 is also designed, according to one embodiment, to be interfaced logically and physically with a radio-television VHF-UHF antenna array 173.

One embodiment of the invention utilizes and improves performance of legacy VHF and UHF television channel frequencies. The RVDM modulation scheme can deliver high data rates within these lower frequency bands without digital data compression. The bit-byte multiplication capabilities shown by example in FIG. 6, enabled by the applied Resonant Vortational Division Multiplex (RDVM) modulation, will extend the life of lower radio-television channel frequencies 62. In a radio and wired electrical power grid environment the vortational signal enables a propagated vortational torque pattern 54, 54*a*, and 54*b* respectively, in order to focus the electro-magnetic energy towards the center axis 93 of the assigned frequency band, according to one embodiment of the invention. In one embodiment, vortational field generator 51 can also be logically and physically interfaced with a fiber optic strand-conductor 63 which acts as a light field guide. Included in the illustration in FIG. 1 is the vortational field guide manifold 53 and 53*a* which are designed for higher frequency applications 182.

Referring to FIG. 1, special high frequency RVDM modulation applications also enable less electro-magnetic irradiation from high frequency bands, because propagated electro-magnetic energy is focused towards the center axis 93 of the target frequency channel. Using multiple resonant field guide arrays with the associated field guide manifolds 53, 53*a* enables high frequency vortational data speeds without having to utilize a costly single high frequency centralized microprocessor. The manifold and the supporting electronics and cascading synchronization methods enable this novel high frequency solution at much lower central processor switching speeds. The multi-field generator manifold configuration serves the provision of high data rates, and multilayered encryption.

In FIG. 1, according to one embodiment of the invention, manifold designs use different quantities of physically and logically conjoined resonant field generators in order to achieve different resonant harmonic and alphabet generation variables. The combined multi-field generator is governed by a specialized synchronized scalar cascading function in terms of combined signal synchronization. Combinations and quantities of resonant field generators in arrays of three, five, and seven serve a better performance potential that even number arrays. Odd number arrays tend to serve better resonant articulation performance than even number combinations. However, in some applications even number manifold arrays as an implementation are envisioned.

In certain applications such as nano level communications it is necessary to provide simultaneous multi-channel communications in a multi-user vortational mobile cellular traffic channel and the like. One embodiment of the invention serves to promote nano technology for telecommunications applications as will be illustrated below. However, the embodiments of the invention are not limited to the world of the nanometer. Embodiments take an existing waveform that defines a communications channel and encode the target waveform with the fractal-vector vortational data units. These unique data units are defined by a predictive electromagnetic geometric shape that is framed and defined by synchronized electron flow that is structured around a defined axis point in the channel projected X, Y, Z, coordinates that are defined in hardware and software means as will be illustratively shown. For example, bracketed and controlled electron flow is known in the valve-tube electronic processing art. The old vacuum tubes were comprised of many different interconnected curved surface arrays of superimposed conductive and dielectric anode and cathode layer designs.

One can observe the flow of electrons between the active energized plates, cylinders, and other vacuum tube component shapes. This process was never understood for its potential because technology has been possessed by one and two dimensional waveform data structure since the days of wired telegraphy. We have time and time again choked down the three dimensional potential of electron flow of vacuum tubes and solid state circuits, and are only using small slivers of information called on and off digital signal modulation methods, for nearly all of our telecommunication technology. The embodiment of the invention makes use of this previously-unexploited multi-dimensional potential.

In still other communication scenarios, embodiments of the invention enable direct communication of XYZ coordinates that can be sent over vortational channel space to any sort of system that needs direct fractal vector coordinates that relates to direct parts designs of any sort of manufactured product with the need of digital conversion. Computer assisted drawing (CAD) and computer assisted manufacturing (CAM) will be revolutionized by embodiments of the invention. These coordinates are highly encrypted because there is no direct digital information that can be gleaned by hackers. Therefore, business communications will become highly secure. This feature set will also work to encrypt all sorts of telecommunications applications for commercial and government related communications.

Each vortational field guide manifold projects-transmits and receives a vortationally encoded and decoded electromagnetic diversified field (EDF) that is articulated by the software protocol means according to an embodiment of the invention. The field generator is designed and engineered of novel hardware design. Included in the specification is user device control software that embodies an abbreviated OSI-ISO architectured layer protocol layer system model that includes, synchronization layer, application layer, and human machine interface and hardware means; comprising a plurality of vortational field generators 51*a*, 51*b*, 51*c*, 51*d*, 51*e*, 51*f*, and 51*g* as shown FIG. 1.

Each vortational field guide manifold is arrayed in different implementation patterns that reflect the design of a particular application specific configuration and the type of communications network it is physically and logically interfaced with. In telecommunications, modulation is the process of conveying a message signal, for example a digital bit stream or analogue signal, inside another signal that can be physically transmitted. According to one embodiment of the invention, the vortationally modulated signal is (a) simultaneously the message signal and (b) the signal that vortationally stabilizes the complete carrier signal and (c) concentrates the signal to the center frequency of a selected communications carrier medium. Most modulation methods support host frequency band stabilization, whereas embodiments of the resonant vortational divisional multiplex (RVDM) scheme offer stabilization through focused electromagnetic vortational torque.

Figure 2:
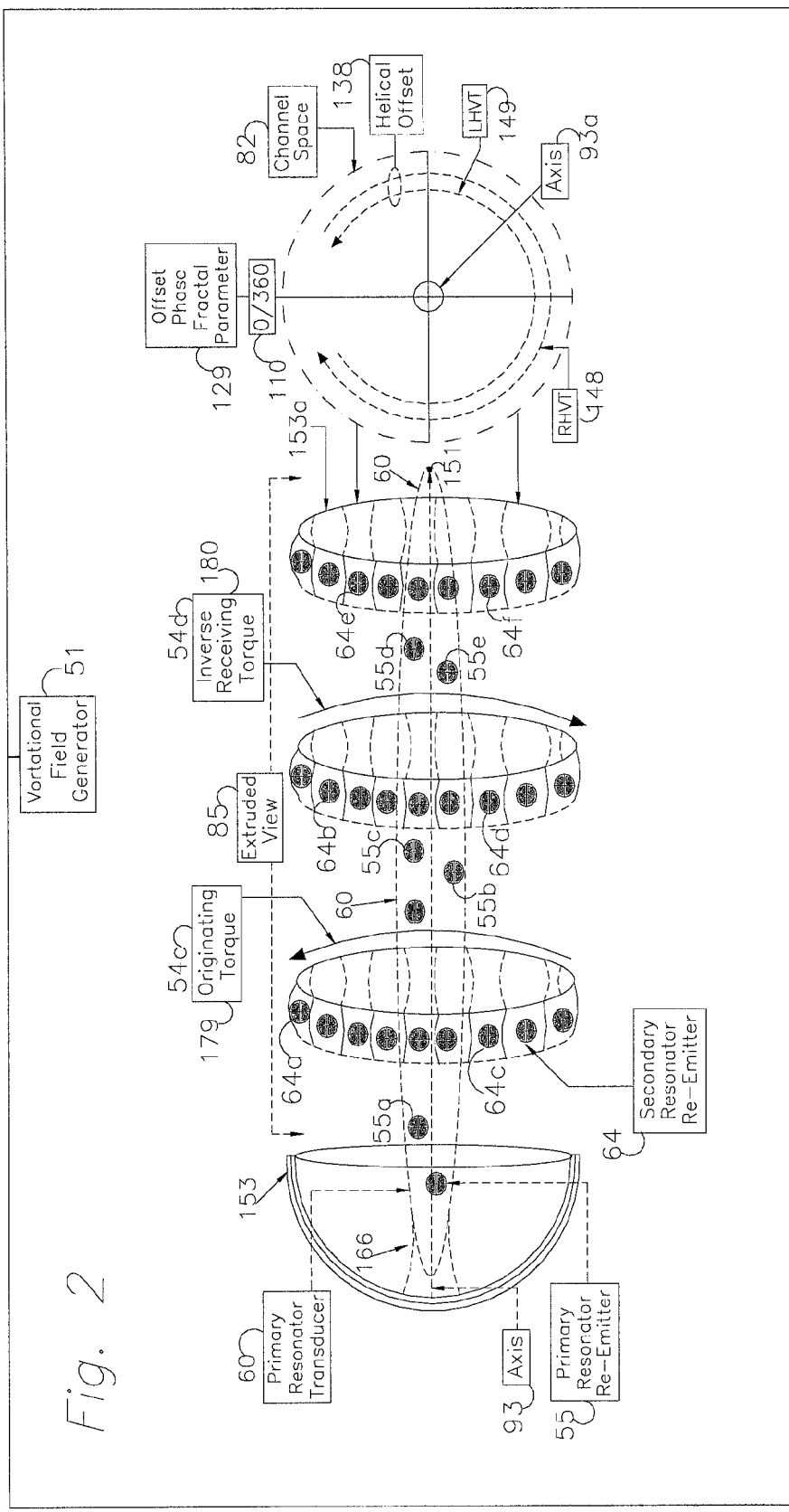
FIG. 2 depicts the resonant field-channel generator and its component parts in an extruded view point, according to the invention.

Referring to FIG. 2, a vortational field generator 51 according to one embodiment is illustrated in an extruded view 85 in order to minimize visual clutter. The vortational field generator is comprised of the following fundamental components. Each generator is fitted with a primary transducer resonator 60 comprising a plurality of embedded primary re-emitter-exciters 55. In this illustration the primary resonator 60 is also extruded 151 in order to show that the resonator in this case extends well within the coverage bounds of the principle field guide housing 153 and 153*a*. Each primary resonator transducer 60 is comprised of a geometrically orchestrated combination of a plurality of arrayed primary re-emitter exciters 55, 55*a*, 55*b*, 55*c*, 55*d*, and 55*e*. The design depicted does not limit the quantity of primary re-emitter exciters that embody the primary transducer. In FIG. 2 the primary resonator transducer in this case is a curved geometric plane. Each primary re-emitter exciter 55 through 55*e* in this case serves as a resonator that transmits and receives one of the electronic signals that comprise a vortational data unit. The primary re-emitter can be reduced to the nanometer level of resolution. The entire primary transducer resonator 60 can be manufactured in the nano scale. However, the shape and complete form factor can be designed in many customized shapes and applied to application specific ratio and scale.

Figure 4:
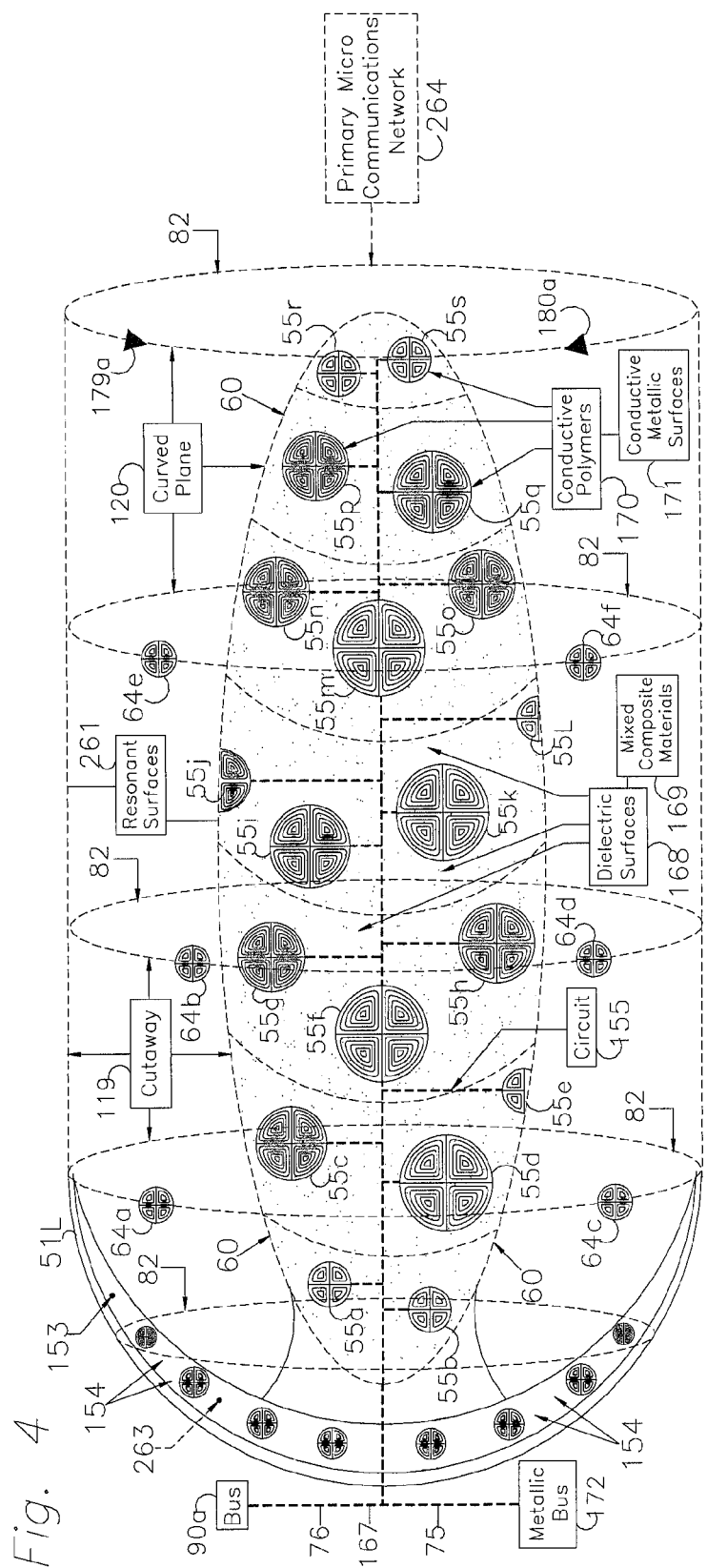
FIG. 4 depicts a cutaway viewpoint of the primary resonator and its associated components, according to the invention.

Each shape of the primary resonator transducer 60 and entire field guide generator is designed to support selected frequency band optimization and application specific implementation in many application specific environments. Referring to FIG. 2 and FIG. 4, there is also included a plurality of secondary resonator re-emitters 64*a*, 64*b*, 64*c*, 64*d*, 64*e*, and 64*f*. Each secondary resonator re-emitter acts and functions as a conductive resonator that is algorithmically selected and energized in accord with the particular data unit and vortational data word that is generated and transmitted for a particular communications event cycle that includes one or more resonant communications transceivers. The vortational field generator housing 153 is constructed of a designed combination of metallic and non metallic materials.

Fundamental to embodiments of the Resonant Vortational Divisional Multiplex (RVDM) method is generating and sustaining vortational torque. Signal torque is initialized during the beginning of a transmitted vortational signal. This originating torque 179 is produced by the vortational signal that can be transmitted from any primary resonator re-emitter 55 and or a secondary resonator re-emitter 64. The originating vortational signal torque in this case is right hand vortational torque (RHVT) 148 trajectory. The vortational signal is modulated in the form of a slanted vortating helical azimuth offset 138. This slanted vortational pattern is sustained throughout a complete communicative act. Inverse receiving torque 180 is derived from the re-transmission from another Resonant Communications Transceiver (RCT), when the receiving transceiver transmits during one full duplex event, the signal correlates in a left hand vortational torque (LHVT) 149 trajectory. The centre axis 93 and 93*a* simply define the center of the field guide housing 153, 153*a* and its oriented position of channel-field center. The target channel field circumference in this case is measured in zero to 360° degree increments 110.

Figure 3:
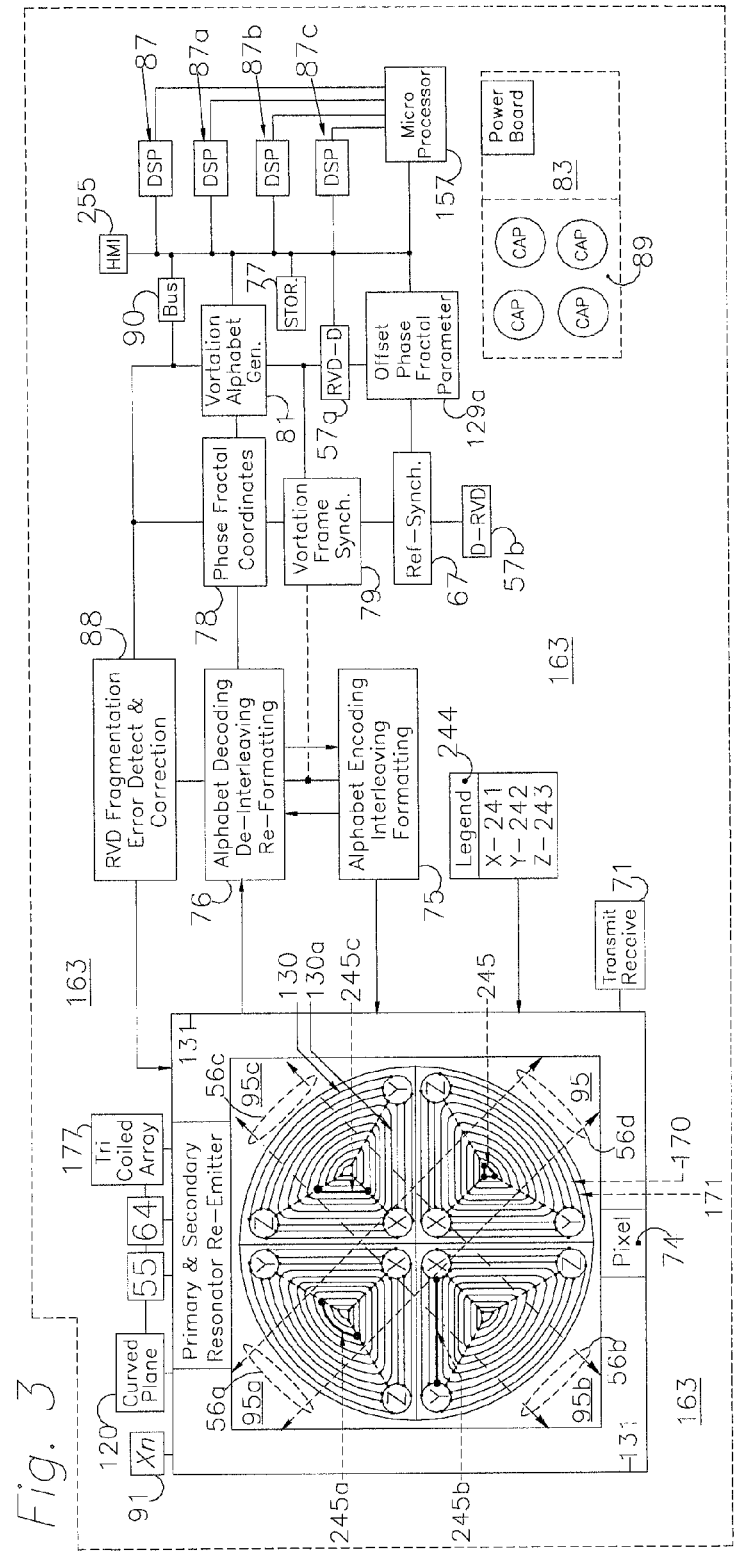
FIG. 3 depicts the resonant communications transceiver printed circuit board and the primary and secondary resonator re-emitter exciter, according to the invention.

Referring to FIG. 3, in some cases selected components need to be conductive when selectively charged. In this case, each primary 55 and secondary 64 resonator re-emitter are quadrants of four tri-coils 95, 95a, 95b and 95c. Please note the primary and secondary resonator re-emitters can be designed with a plurality of tri-articulated coils, the design is in no way confined to quadrant patterns. Each tri-coil is an independent communication resonator. For example, each tri-coil is not designed to be necessarily placed and arrayed in selected group quantities, it is envisioned that each tri-coil can be designed in ad-hoc arrays within the composite structure of primary resonator transducer, and the interior surfaces of the resonant field generator. In one embodiment, the tri-coil is also designed to be placed in an offset 30° to 45° degree tilt where each tri-coil surface is tilted towards the outside of the associated resonant field generator, where it is pointed towards another RCT transceiver.

According to one embodiment of the invention, RVDM modulation is related to circular polarization. This method of radio transmission is well known in the radio and satellite communication arts. In electrodynamics circular polarization of an electromagnetic waveform is a polarization means in which the electrical field of the projected waveform does not change strength or amplitude but only changes direction in a rotary type manner. Embodiments of the invention utilize the force and magnitude of the circular polarization model in order to generate and sustain a vortational helical trajectory of the signaling means. In electrodynamics, which is another way of saying electromagnetism, the strength and trajectory of an electrical field is defined by what is called an electric or electro-dynamic field vector. According to embodiments of the invention, one electromagnetic field vector equates to a phase fractal envelop. One phase fractal envelop is combined with two other phase fractal envelops in one transmission act. Three combined phase fractal envelops equals a vortational data unit sample.

Figure 5:
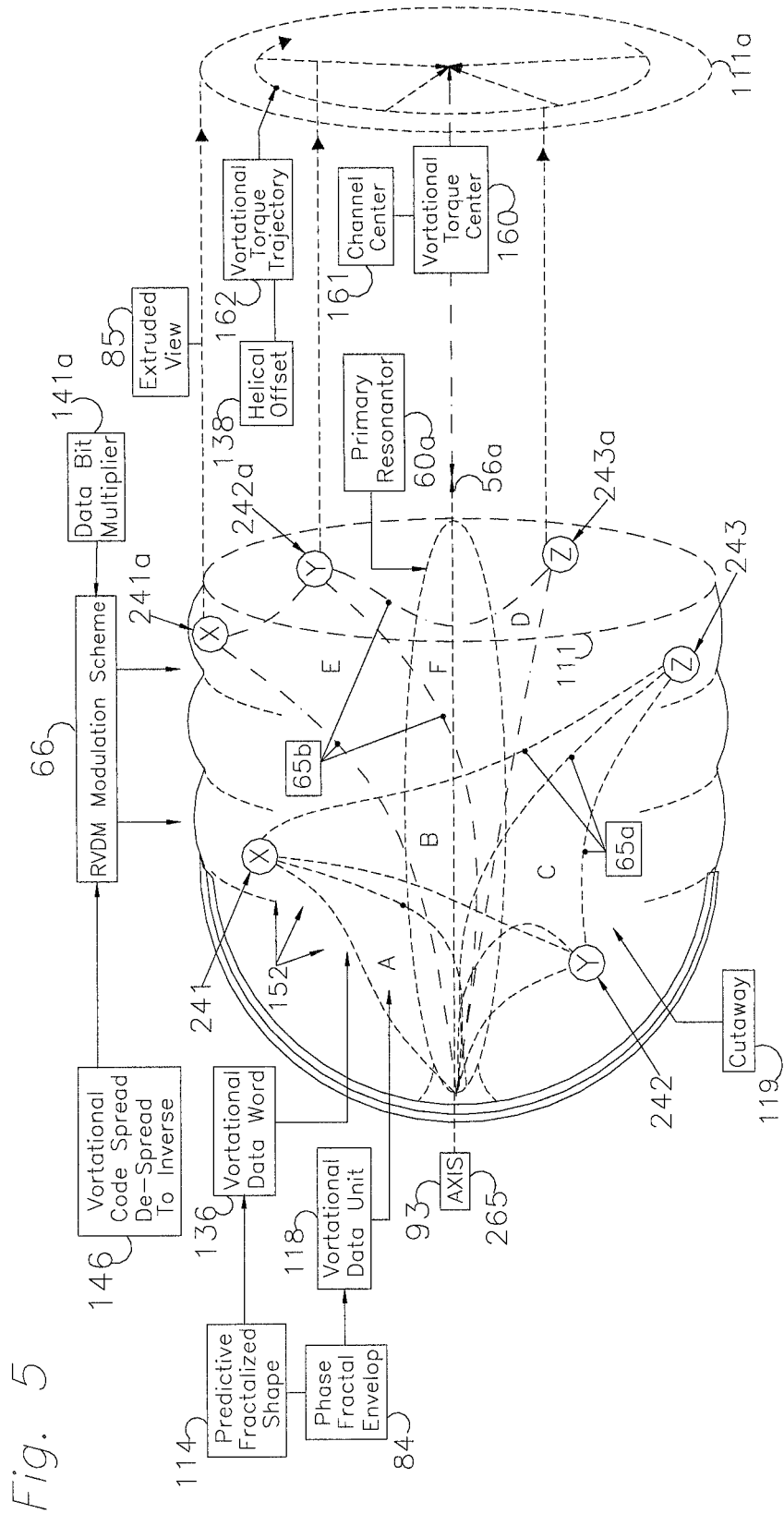
FIG. 5 depicts a logical block diagram of the two vortational data word and six individual phase fractal envelops, according to the invention.

In selected prior art designs and configurations, the concept, process, and functions of phase are related to timing of a waveform. Embodiments of the invention utilize the idea that phase as an offset parameter from channel-field center that helps to define and understand the concept and method of the phase fractal envelop 84, 115, 116, and 117 as a data sample that converts to any alphabetic algorithm, as depicted in FIG. 5. Each unique phase fractal-envelop-shape as a data sample defines the arbitrary value of the fractal alphabet that relates syntactically to any designated human language grammatical construct or language character unit. The concept and usage of the term wave envelop and wave envelop shape is well known to those who practice the digital sampling arts. A mathematical fractal is based upon an equation that undergoes iteration, a form of feedback that is based upon recursion. There are several examples of fractals, which are found in nature.

Referring to FIG. 2, an embodiment generates vortational electron flow which induces vortational torque. In this case there is right hand vortational torque (RHVT) 148 and left hand vortational torque (LHVT) 149. Referring to FIG. 4, torque is usually associated with mechanical rotations in electrical motors and internal combustion engines. In Quantum Chroma Dynamics (QCD) and Quantum Electro Dynamics (QED) and Particle Vector Physics (PVP) the concept of photon and electron resonant torque is a central tenet of these models in theoretical physics. In FIG. 2, in one embodiment, the vortational modulated torque is focused towards the center or axis 93, 93a of the frequency channel. Another benefit is that the electromagnetic energy is focused towards the center axis in order to minimize signal loss, reduce noise and interference, and reduce erratic signal irradiation. These erratic convolutionally coded waveforms are projected harshly into the environment. There is conventional fractal compression, where it enables a lossy image compression method that uses fractal mathematics. The embodiment uses no form of data compression. However, the embodiment clearly illustrates one of a plurality of ways that applied fractal logic can be used for the improvement of selected communication technologies.

The embodiment's fractal coded vortational data words and data units are dynamically formed to fit the instant host channel condition that enables seamless propagation and are not compressed in any way. One of the fundamental features sets of the embodiment's vortational modulation method is that it based upon a constant shifting of the vortational data word and vortational data unit sizes, with respect to ratio and scale proportions when compared with the frequency of the host sine wave frequency and amplitude. Embodiments of the invention provide communications systems that enable a protocol that creates variable dynamic resolution of vortational data words and data units in any communications channels scheme. We no longer have to experience the harmful effects of forced symmetrical uniformity onto Nature's environment and our own. RVDM focuses electrical dynamic energy towards the center of a selected channel space. This will help to cut down harmful radiation.

Figure 8:
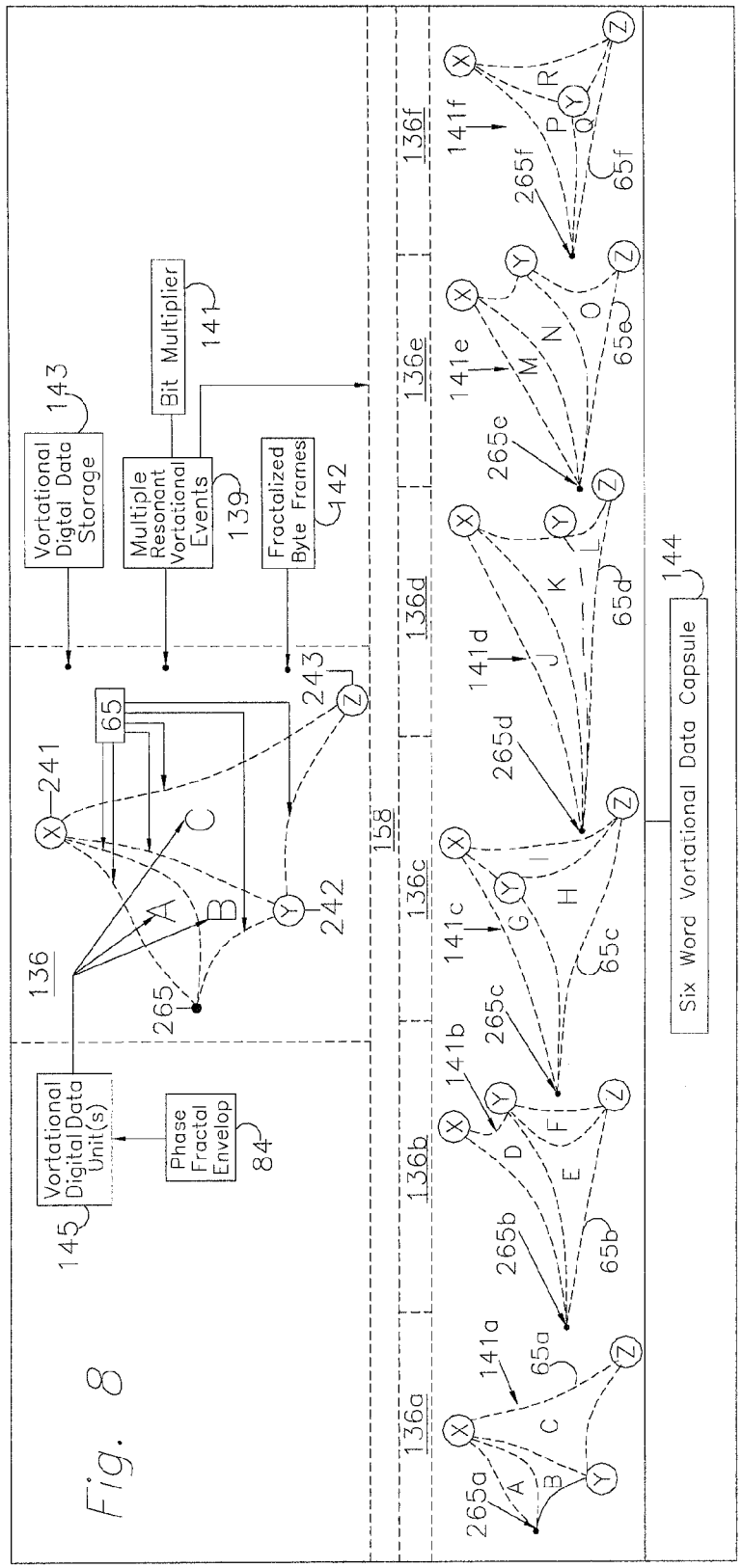
FIG. 8 depicts the resonant digital vortational data word and data unit as generated and progresses in a field generator, according to the invention.

The concept and process of phase and the relation of phase to the embodiment's resonant vortational data words and data units have to do with the relative position of the fractalized data units to each cyclical progression of the sine wave and its instant condition. Moreover, one embodiment of the invention extends significantly from the conventional idea of phase in conventional electrical and electronics engineering. The idea of phase in this context relates to the phase space concepts of Hamilton and Minkowski, which reflect their mathematical analysis of electron-photon trajectories in a bracketed phase space. Embodiments of the invention glean from these high level abstractions of mathematical phase space and apply these ideas to functional telecommunication system apparatus and instrumentality. Referring to FIG. 8, herein there are depicted selected iterations of the vortational data word 136, 136a, 136b, 136c, 136d, 136e and 136f, according to an embodiment of the invention. Contained within each vortational data word are a plurality of vortational data units 145 that are interpreted as capital letters of the English Alphabet, for example: A, B, C, D, E, F, G, H, I, J, K, L, M, N, O, P, Q, and R. The fractal shape of each fractal envelop in fact defines the particular value of the data unit. The shape relationship is geometrically and resonantly related to each fractal envelop. Embodiments of the invention enable any language character to be arbitrarily attributed to each fractal shape which is defined by its phase fractal envelop 84. The vortational data word is comprised of three phase fractal envelops. Each phase fractal envelop is a phase fractal data unit that is produced and sustained by the vortational modulation method according to embodiments of the invention.

With reference to FIG. 5, each vortational data unit 118, which is a phase fractal envelop 84, is formed by the synchronized charged flow of electrons between each vertex point that designates each secondary resonator re-emitter 241, 242, and 243. In this way the host sine wave and its associated electromagnetic flux is completely fractalized. This embodiment relates to electrical power grid applications and other applications that perform host waveform fusion with the vortational data information at coarse granularity-resolution levels. In other applications where more dense vortational data unit granularity is required, with reference to FIG. 9, vortational data symbols 245 are generated within each of the resonators tri-coil conductive vector layers 253.

The standard definition of a fractal is a rough or fragmented shape that can be split into parts. In one embodiment of the invention, these generated parts comprise the vortation data words and vortation data units. In FIG. 8 each phase fractal-envelop 84 is a fractalized equivalent eight bit byte frame(s) 142. Each generated phase fractal envelop 84 is a data bit multiplier 141, 141*a*, 141*b*, 141*c*, 141*d*, 141*e*, and 141*f* which equates directly to standard digital data units in the form here of vortational digital data units 145. Each vortational data word and its constituent vortational data units convert through novel phase fractal envelop fractal-vector XYZ coordinate transcoding to standard digital.

The generation of vortational data units and vortational data words between primary and secondary resonators is but one way of forming vortational data information. This type of vortational data word and vortational data unit is processed and formed as a result of the flow of electrons 65 that occurs between three or more secondary resonant re-emitters 64*f*, 64*g*, and 64*h* and its originating axis point 265*a* that is located at the bottom of each designated tri-coil 95*a* as shown in FIG. 9. In one embodiment, the primary resonator transducer 60 as shown in FIG. 2 is constructed of a combination of conductive and non-conductive materials that utilize proprietary combinations of geometric shapes, curves, and arcs that are three dimensionally set in convex and concave form factors. These novel form factors act to tightly focus the fractalized vortational data words and vortational data units that are being simultaneous transmitted to additional resonant vortational field generators that comprise resonant communications transceivers in one embodiment of the invention. In FIG. 5, these concave and convex shapes act to focus each vortational data unit within the electromagnetic construct that acts as a graduated focal plane gradient where each resonator tri-coil group is arrayed. Each primary resonator transducer 60 uses a different topological-physical shape that functions best with respect to the custom design of each application specific telecommunications device.

Referring to FIG. 3, a logical block diagram of the resonant communications transceiver's main component parts is illustrated according to one embodiment of the invention. The transceiver is comprised of a printed circuit board 163 and power board 83 that contains a plurality of capacitors 89. The invention utilizes an optical or other high speed microprocessor 157. Embodiments of the invention may use different microprocessors such as ARM 11 and the like. In fact any microprocessor that provides adequate switching speeds plus enough overhead and error correction means can be utilized. Also included is a digital signal processor (DSP) array 87, 87*a*, 87*b*, and 87*c*. Looking forward, embodiments of the invention will utilize hyperbolic processors that utilize the vortational data logic. The transceiver PCB 163 is populated with selected bus logic 90 arrays that provide the multilayered communication pathways like any other well designed and manufactured telecommunication device circuit 155 PCB 163 board.

Also included in the transceiver block diagram are protocol modules, including but not limited to the Alphabet storage module (STOR.) 77, Vortation Alphabet Generation module (VAG) 81, Offset Phase Fractal Parameter (OPFP) protocol Stack module 129*a*, and the Master Reference Synchronization (MRS) module 67. There is provided a Resonant Vortational to Digital (RVD-D) data conversion module 57*a*, and a Digital to Resonant Vortational Data (D-RVD) data conversion module 57*b*. There is provided a Vortational Frame Synchronization (VFS) module 79, and a Phase Fractal Coordinates (PFC) reference module 78. There is also provided an Alphabet Encoding Interleaving Formatting (AEIF) module 75, an Alphabet Decoding De-Interleaving Re-Formatting (ADDI) module 76, and a Field Generation Interleave Phasing Re-Emit Burst Generation (FGIP) module 167.

In FIG. 3, there is a provided a specialized primary and secondary resonator re-emitter exciter 55 and 64 respectively. Technically, there is no difference between the primary and secondary resonator re-emitter. These terms are used to simply help to better understand the flow of protocol relationships when a full duplex communicative act is initiated. The tri-coil is a unique electronic inducting coil that is scalar in terms of graduated-gradient layers which govern the mathematical function that is the template vortational data unit granularity and its graduated physical tri-coil vector layer array. Each tri-coil is comprised of curved and straight vector conductor(s) 130 and 130*a* respectively. Each straight vector conductor is uniquely bent in a distinct tuned contour. Each distinctly tuned vector conductor contour defines a unique harmonically tuned electron signature. Combined is an XYZ array of each tri-coil layer. Each is individually connected to its own communication path to the DSP and Microprocessor array which is logically and physically interconnected to the combined and multi-layered PCB bus 90. In one embodiment, the vector conductor energizing sequence is important in order to generate and sustain stabilized vortational data units and vortational data words in a defined channel-field space.

In FIG. 3, the embedded circuitry and data processing components provide the means for the multiple software-firmware protocol stacks in accordance with embodiments of the invention. The protocol stack includes but is not limited to initializing and sustaining the alphabet encoding interleaving and formatting 75. This process is accomplished within the synchronized vortational fractal-vector structures that are formed by the sequenced energizing state of each primary and secondary resonator re-emitter-exciter that forms a sustained vortational spin-vector. In FIG. 2, vortational structures that are formed by the inter-relationships of the (a) primary resonator transducer 60 and its contained primary resonator re-emitter exciters 55 (b) secondary resonator re-emitter array 64*a*, 64*b*, 64*c*, 64*d*, 64*e*, and 64*f*, comprise the vortational frame that is synchronized 79 with the host channel reference sync. 67

Referring to FIG. 3, the printed circuit board (PCB) 163 is populated with a plurality of software modules and firmware modules that are electronically and physically integrated circuits, which are embedded microchips that include fully programmable gate arrays (FPGA), application specific integrated circuits (ASIC), digital signal processors and the like. This architecture is a series of abstraction layers; hardware, firmware, operating system, and application specific functionality layers. This aggregate assemblage of component parts, serve to provide the invention's protocol functionality. What is described here is the functional role of each component part and the interrelationship of the protocol layers, and how these modules generate, sustain, and terminate a successful RVDM vortational data communications event, in accordance with embodiments of the invention. As such, there is provided an optical microprocessor 157, in this case any microprocessor that enables adequate switching rates, plus data processing headroom for each application specific implementation of the preferred embodiment such as the power grid solution, the wireless radio and satellite solution, and the twisted pair solution. In most application specific cases the ARM series of central processors are more than adequate.

In FIG. 3 there is also provided software kernels that enable precise synchronization and protocol communication between processes called inter-process communication (IPC). In one embodiment, the IPC provides specialized protocol converters that enable resonant vortational data to digital data conversion (RVD-D) 57a and digital to resonant vortational data (D-RVD) 57d. These IPC modules act to convert selected vortational data words and vortational data units to conventional digital samples, and the inverse digital sample conversion to vortational data conversion, respectively. Each vortational data word and its constituent vortational data unit converts through phase fractal envelop fractal-vector XYZ coordinate transcoding to standard digital, again like reading a three dimensional map of a mountain range or the sea floor, and converting the coordinates to digital code that is the basis for conventional data storage of vortational data units codes in standard digital storage means. These digital coordinates can be converted to phase fractal envelop coordinate that are physically referenced from the tri-coil layers of each primary and secondary resonator, this is applicable on the inverse as well.

Referring to FIG. 3, there is depicted the primary re-emitter exciter 55 and secondary re-emitter exciter 64, in one embodiment. Both the same primary and secondary resonators transmit and receive 71, like any communication system emitter and exciter or antenna array, and both must mirror another resonator tri-coil that is a component of another RCT transceiver. In FIG. 3, there is depicted a configuration legend 244. The legend defines the X-241, Y-242 and Z-243 axis depicted on the lower bottom tri-coil 95. The legend is entered here in order to reduce visual clutter. This design enables an nth dimensional 91 plurality of associated Quadrant Arrays and tri-coil layers 253. The only limit is apparatus design with particular emphasis on the resolution limit of each primary re-emitter exciter and secondary resonator. Each tri-articulated X, Y, Z coil 95, 95a, 95b and 95c, can produce n dimensional alphabet variables by virtue of how each X, Y, Z, tri-coil layer acts as a dynamic projected alphabet template reference point. Each conductive vertex pole is physically connected to the RCT PCB 163 bus topology by conventional manufacturing means.

Each tri-coil strand is defined here as a conductive vector. This vector conductor, physically interconnected to two other tri-coil vector conductors, acts as a physical conductive element 256 like any other electrodynamic coil. These elements directly form an X, Y, Z, vector shape that is comprised of a minimum of three conductive vector electron pathways. These tri-vector shapes are the fundamental template for a phase fractal envelop that directly equates to a vortational data unit which further equates to an eight bit byte sample. It is contemplated that there will be additional application specific designs that have many conductive electron pathways with offset parameter interrelationships. These designs are more complex and serve many custom application specific configurations. For example, another tri-coil 95c design is based upon a twist from the top plane 266 to the axis point in FIG. 9. In FIG. 9, the embodiment's XYZ triangular electron pathways form dynamic vectors that electronically interconnect to every other XYZ layer that comprise a particular tri-coil design as will be elaborated upon below.

Referring to FIG. 9, an exploded view 248 of a primary and or secondary resonator quadrant 131 is depicted. Again, note that the designation primary and or secondary resonator is simply a way of showing the vortational electron signal path from its origination to re-emitting relay path until a termination process in completed by one or a plurality of RCT transceivers. Regardless of a particular signal flow path, each resonator is designed to mirror each other in its form factor. In this particular application specific case, each resonator is comprised of four tri-articulated coils 95, 95a, 95b and 95c. Each tri-coil is arrayed in self-similar layers that are at once larger and smaller in accord with ratio and scale measured vectors of each phase fractal envelop. Each envelop is generated and formed through the electron flow that occurs between tri-coil vector layers 253 within the tri-coil itself. This electron signal path activity also interrelates with other vector conductor array layers that reside within other associated tri-coil XYZ vector conductor layers.

These tri-coil vector conductor layers are interconnected through conductive electron bus paths that are arrayed between the axis conductive points 265a, 265b, 265c, and 265d, and the top plane 266 that is a curved plane 120. As mentioned, the top plane of each tri-coil positional attitude can be positioned in a frog eye design where each resonator that is comprised of four tri-coil is slanted at a 30° to 45° angle in relation to the target vortational signal path.

As disclosed, a phase fractal envelop is generated and formed between each initiated tri-coil vector layer and other tri-coil vector conductor layers such as the depicted XYZ X11, X8, X3 and X9 respectively. Therefore, each phase fractal envelop possesses different granularity-resolution levels that depend upon how each envelop is assembled from layer to layer during a generation-transmission event. The core design of each tri-coil directly signifies the electro-mechanical scalability that is directly associated with the desired granularity of the vortational symbol that is a key component of the dynamic alphabet generation protocol function. The Hamiltonian phase space cone, or funnel shape of the tri-coil, is but one of a vast array of tri-coil topological spiral twists and turns, radian based expansion chambers that are shaped in stretched, elongated, compressed toridial radian constellations and the like. The designed shape is application specific dependent.

A more detailed description of the mathematical relationships is now provided. Each XYZ vector conductor electron path is physically and logically mapped in conventional mathematical means that are directly related to how radar systems and sonar systems use measured mathematical vectors. These vector relationships act as dynamic vector maps that arbitrarily define relative position coordinates within the substrate topological form that directly identifies a target object as it travels in relation to another physical object that is traveling or is stationary in a local channel-field vector space. Each tri-coil vector layer is comprised of three vector conductor electron paths that act as simple coordinate reference points. Combined, each tri-coil layer potentially provides an infinite diversity in terms of phase fractal envelop shape that enables an unlimited alphabet diversification potential. Therefore, each vortational data unit format differentiation enables a repeatable topological shape that directly equates to individual phase fractal envelop shape. Each alphabet character is based upon a mathematical matrix that brackets the phase fractal coordinates that are based upon standard trigonometric mathematical equations well know who practice the mathematical arts.

The letter A as an example, possesses a particular array of phase fractal coordinates that are based upon the measured template of each tri-coil vector conductor layer and its association with other tri-coil layers within one tri-coil and its layer relationships with other vector layers that reside in other associated tri-coil vector conductor electron paths. This is related to any data symbol which is generated and projected in channel-field space, and stored by electronic digital means. A digital signal produces a binary symbolic shape that is comprised of an on-one and off-zero for example.

In FIG. 9, this unique vortational data element-shape possesses its own electron topology and associated topography that acts as a dynamic topogra-scape and is directly associated with its dynamic bit multiplication means that is based on the dynamic ratio and scale functions. This topogra-scape is periodically defined and mathematically bracketed in terms of its dynamically manipulated resonant potential due to its ratio and scale coordinate relationship to the tri-coil axis 265*a*, 265*b*, 265*c* and 265*d* and the top plane 266, not its signal output power or amplitude relationship like most modulation schemes. In hybrid networks like the electrical power grid signal, amplitude and power level rise and fall due to load variables. Again, vortational data unit and vortational data word constructs are fundamentally based upon ratio and scale transform equations that are integrated into trigonometric coordinates that will enable conventional mathematics to be utilized in order to define tri-coil vector layer coordinates that signify the physical fractal position and relationship to other associated tri-coil XYZ vector elements 256.

Referring to FIG. 4, the disclosed illustration is a simple cutaway 119 example of the resonant field generator. The surfaces and interior form factor of the primary resonator transducer 60 is comprised of conductive polymers 170, and conductive metallic surfaces 171, that are mixed with composite materials 169 that comprise selected dielectric surfaces 168 and other embedded form factors. These elements, in an array and circuit topology that enables isolated voltage charges to flow to each resonator tri-coil and corresponding vector conductors, in order to minimize vector conductor cross talk. Each PCB bus 90 circuit 155 that leads from the appropriate RCT processing module to each tri-coil conductive vector is also isolated. The population topography of the resonator re-emitter exciters 55*a* through 55*s* and 64*a* through 64*f* are shown here on the surface of the primary resonator transducer 60 and resonant field guide generator housing and its inner surfaces, according to one embodiment of the invention. The populated array of resonator re-emitters shown here reflects a sparse array of an aggregate resonator nodal network. In this case, each resonator is a communications node in a nodal topology that comprises a primary micro-resonant vortational communication network 264 that is the resonant field generator itself.

In FIG. 4, this micro nodal network communicates/intercommunicates with each resonator node and its embedded tri-coils in order to generate vortational data units which are dynamic vector shapes. Again, a vortational data word is an aggregate assemblage of three vortational units. Each phase fractal envelop is formed from the bracketed electron fabric that defines the periodic vortational data unit. Each vortational data unit is directly associated with a conventional eight bit or truncated hexadecimal character such as commonly noted in Full ASCII formats.

Described in another way, the digital form of the vortational data characters take shape after matrix coordinate conversions to selected digital binary code formats, via the disclosed trigonometric coordinate matrix equations. The simple conversion process of taking standard eight bit byte octets is associated with ASCII characters and is directly associated to the particular physical design of each tri-coil, its vector conductor layers, and relationships of XYZ electrodynamic formations. These formations are related to the intended type of vortational alphabet format that is coupled with the aforementioned coordinate that can be viewed as a fractal vector mathematical coordinates system. In FIG. 3, the vector conductor is connected via bus connection type at each layered XYZ and vertex point X-241, Y-242, Z-243. Each strand connection point is a physical vector element 256 that is interconnected to the PCB 163 bus 90.

Referring to FIG. 9, the basic XYZ template is formed between multiple layers by each energized tuned vector conductor 245, 245*a*, 245*b* and 245*c* that is bracketed and connected between each X-Y-Z vertex point. The three vector conductors that reside between each XYZ vertex point that are arrayed in tri-coil layers 253. For example X layer X9 is directly associated to the energized vector element 245*a* that is designated on tri-coil 95*a*. X3 is associated with layer X3 energized vector element 245*b* that is located on tri-coil 95*b*. This description is focused upon the X vertex. For simplicity sake and to avoid visual clutter, the designated X layer also includes the associated Y and Z vertex points that are interconnected within the frame work of the same layer. The X layer designation is used solely for a simple specification focus point. Each associated vector is dependent upon applied variable volt sustain and a defined periodic duration that governs electron flow between each conductive vertex point that is designated here by X-241, Y-242, Z-243 as shown in the associated reference Legend 244 on each tri-coil example 95, 95*a*, 95*b* and 96*c*. The process of converting them to vortational data units and vortational data words is assembled in the RCT user device protocol stack that is interfaced physically and logically with any form of human machine interface so selected.

When an apparatus according to an embodiment of the invention is manufactured, resonator nodal topology will be highly dense which will deliver vortational data words and vortational data units with dense or coarse ratio and scale variables in order to deliver as dense a granularity-resolution level as is attainable. The only limiting performance factor is the design and manufacturing method applied to producing the component parts that comprise the RCT transceiver. This process results in the highest vortational data unit character resolution possible. The size and articulation means is directly associated with the instant channel field condition, that is fed back to the originating RCT transceiver. Also, in order to avoid visual clutter of specification elements in this illustration, there is depicted a rather coarse example of nodal granularity concentration and density. Moreover, consider that the primary resonator transducer surfaces and field guide interior surfaces function as a primary field guide manifold.

Referring to FIG. 4, the primary resonating transducer 60 and the field generator housing 153, including the outer housing shell and its inner surface serve as a primary vortational field guide antenna. By simply arraying the resonator tri-coils external where the axis of each tri-coil in inverted to be the top vertex, it is contemplated that the design will enable a massive shift in how satellite antenna arrays are designed. This will be the first fractal antenna design that transmits and receives three dimensional vortational data information. The primary resonator transducer and the interior surfaces of the resonant field guide generator is a topological manifold. This complete manifold is a mathematical map of the curved planes that form a topographical structure of peaks and valleys that also can be seen as branching pathways that merge back on themselves like a Mobius strip planar Curve 263. The curve itself enables dynamic content flow that can change, that is derived from Mobius strip recursive-feedback topologies with respect to the curved surfaces of the primary resonator and the interior field generator housing surface 261 that is harmonically tuned. Note that the rear of the interior surface of the field guide generator is populated with resonators 154 in order to provide as many alphabet character varieties as possible, this also adds to vortational signal path trajectory and stability as well. Each resonator and its associated tri-coil act as vortational signal relay points. This is necessary in order to direct the vortational flow in order to: (1) sustain helical vortational trajectory while (2) simultaneously each phase fractal envelop is generated that formats the flow into phase fractal vortational data units and corresponding vortational data words that equate to one or a plurality of alphabet characters.

Referring to FIG. 3, in order to reduce descriptive complexity, the communicative act illustrated here signifies the process of entering a command to transmit a message that contains the capital letter A. This simple message is transmitted from one RCT transceiver to another. The user enters a command set at the human machine interface (HMI) 255. An HMI can be the keypad of an RCT enabled wireless radio device that operates over terrestrial and or satellite communications networks. In another communications scenario, the RCT transceiver can be configured to transmit messaging over an electrical power grid network and/or a twister pair telecommunications network.

The RCT transceiver contains a PCB 163 that is populated with data processing, protocol management, and data storage modules. There is provided a plurality of protocol control software and firmware modules. The Alphabet storage module (STOR.) 77 is designed and programmed to contain each alphabet character that comprises a particular language base that is directly defined by the XYZ phase fractal vector trigonometric coordinate(s) 78 of a vortational data unit that represents the letter A. Vortational data unit alphabet characters are projected from selected tri-coil vector layers 253 as shown in FIG. 3 and FIG. 9 which are two illustrations that are closely linked by the different viewpoints of similar specification elements such as the four tri-coils 95, 95a, 95b, and 95c. To recap, each tri-coil is comprised of curved and nearly twisted vector conductor(s) 130 and 130a respectively.

Each twisted vector conductor is actually uniquely bent in a slight twist that enables a distinct tuned contour that relates to a particular harmonic tune. Three distinctly tuned vector conductors are combined to enable an XYZ arrayed oscillatory harmonic variable, that is directly controlled by the alphabet generation 81 means which manipulates each individually energized vector conductor during the generation, projection, and transmission of each XYZ phase fractal coordinate 78 vortational data unit.

In the following sections it is advisable to use FIG. 3 and FIG. 9 as a visual and conceptual logic cornerstone so that the reader can follow the protocol design flow that enables a full duplex RCT transceiver communicative act. Use these cornerstone figures as an axis point of perception when viewing the other figures, in order to have a better understanding of the important details of the disclosed embodiment's duplex communicative act. When the command set is entered by the user, the contained digital instructions algorithmically retrieve the matrix coordinates that directly equate to the letter A character.

Once the letter A is retrieved from the storage module (VAG) 77 using digital means, then the coordinates are sent to the vortational alphabet generation module 81. The mathematical XYZ coordinate system directly reflects particular vector conductor coordinates that are the primary pattern generators and projectors of XYZ shapes that define each phase fractal envelop. Once the letter A-phase fractal envelop coordinates are sent over a connected circuit 155 they are digitally sent via the PCB bus 90 that leads to the Alphabet Encoding Interleaving and Formatting module (AEIF) 75.

From this module the Microprocessor 157 and DSP array 87 through 87c send and manage the instruction sets that cause the AEIF module 75 to send voltage to the appropriate tri-coil group. The selected XYZ vector conductor coordinates where the phase fractal envelop version of the letter A is generated and projected into a selected channel field space.

Referring to FIG. 9, the phase fractal envelop version of the A is generated and projected for transmittal. In most cases the phase fractal version of the letter A is assembled along with a plurality of other ASCII characters such as numbers, letters and other grammatical related characters that comprise a plurality of vortational data words as shown in FIG. 8. Here, there are six vortational data words 136a, 136b, 136c, 136d, 136e and 136f, which comprise a message capsule 144. Referring to FIG. 9, depicted are four tri-coils 95, 95a, 95b and 95c. There is included the originating vector (X9) 245a, that is first energized from the tri-coils axis point 265a. The originating vector point in this case resides at the most dense granularity level of this designated tri-coil 95a. When energized, the electrons flow towards the negatively charged tri-coil layer vector conductor 245a (X9). When excitated the electrons are attracted from Y-242 in 95a to Z-243 in tri-coil 95a, on the same (X9) tri-coil layer. This protocol action forms the first vector conductor link from its axis originating point, axis point 265a. The next vector conductor link 245b (X3) is simultaneously energized in tri-coil 95b. The third and final vector conductor link to be simultaneously energized and projected into channel space is 245c (X8) in tri-coil 95c. This completes the formation of the vortational phase fractal letter A. This simultaneously generated, assembled and projected phase fractal envelop is transmitted to another RCT transceiver.

Figure 7:
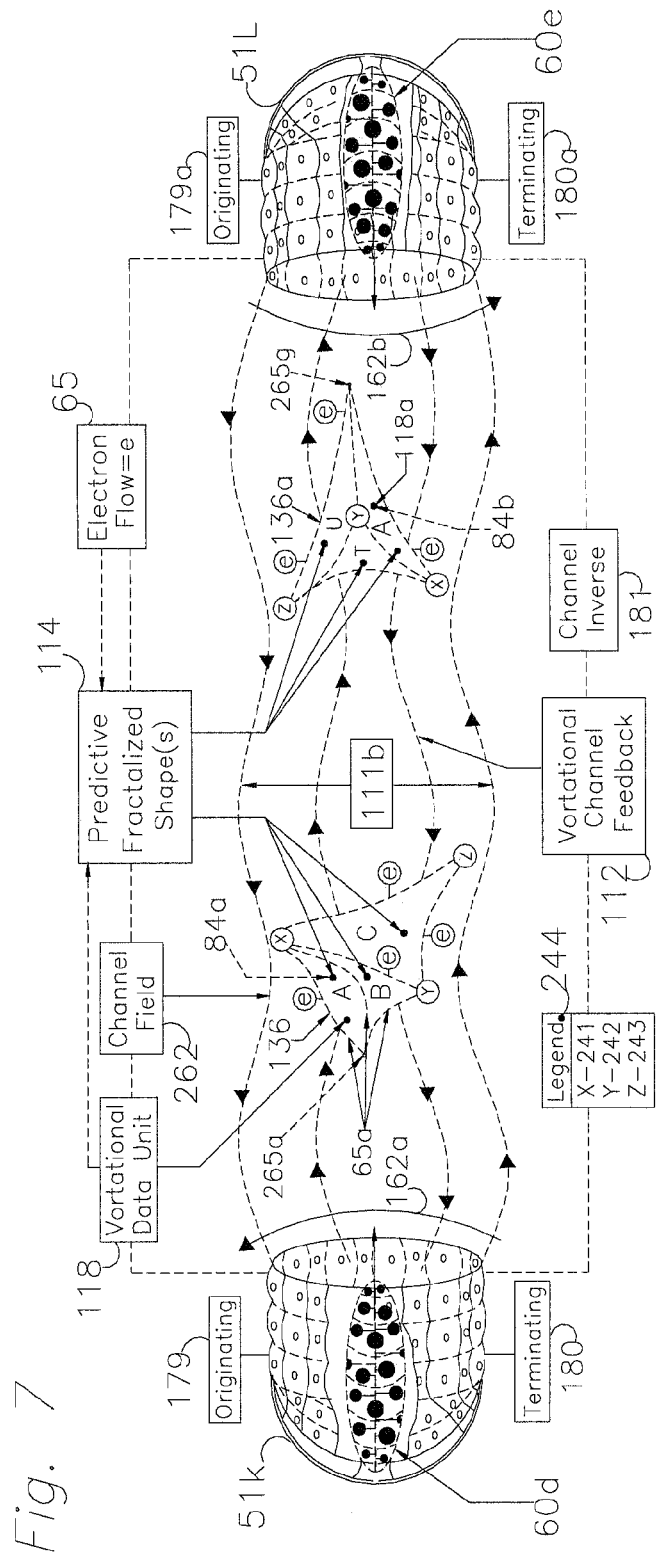
FIG. 7 depicts a resonant field-channel communication act between two resonant field generators, according to the invention.

Referring to FIG. 7, depicted in this illustration is a simple example of a vortational data communication channel field 262 that is defined by a frequency carrier base band signal 111b. Depicted in this drawing are two resonant field generators 51k and 51L, which represent two RCT transceivers. When an originating 179 RCT transceiver it transmits the letter A as one phase fractal envelop 84a vortational data unit 118. Note that this phase fractal envelop has been generated with two other phase fractal envelops that represent two other characters. In this case the letter A is one of three phase fractal envelops that comprise a complete vortational data word 136 that are predictive fractalized shapes 114.

However, in this simple example we are only concerned with one phase fractal envelop that represents the letter A 118. The method of generating, assembling and projecting a transmitted phase fractal envelop that represents the letter A is the same as previously disclosed for all other characters, except the tri-coil vector conductor composition is different for each character. Referring to FIG. 7 and FIG. 3, when the terminating 180a RCT transceivers resonant field generator 51L receives the transmitted phase fractal envelop when the tri-coil detects and the transmitted phase fractal envelop. Once received and detected the Alphabet Decoding module 76 sends to the Phase Fractal Coordinates module (PFC) 78, the Vortational Alphabet Generator (VAG) 81, the protocol stack of the RCT transceiver does a phase fractal envelop via the stored coordinates, perform the resonant vortational data (RVD-D) 57a to digital conversion procedures and stores the phase fractal envelop message that equates to the letter A in standard digital form. The user who received the letter A from RCT transceiver 51K, now chooses to retransmit the letter A to the originating 179 user from RCT transceiver 51L. When the user of receiving transceiver wants to originate 179a, the process of re-transmitting the letter A to the originating RCT transceiver 51k is exactly the same as the first transmission that has been disclosed in detail, the channel inverse 181 is not different.

In some cases a complete communicative act can be generated from one tri-coil. However in order to provide full symbol diversity multiple tri-coils must be used. In still another embodiment, tri-coils that reside on the primary resonator transducer will communicate with selected tri-coils that reside on the resonant field generator housing surfaces. In some cases the resonating tri-coils will be embedded in parabolic antennas for use in satellite communications. Note that any tri-coil vector conductor layer 253 can be designated the originating vector conductor. In this case voltage flows from positive to negative from the originating energized X-Y-Z vector connection point that is defined by one of three X-Y-Z connection point, that is, the energized electrons flow from the positively charged point to the negatively charged point.

Figure 6:
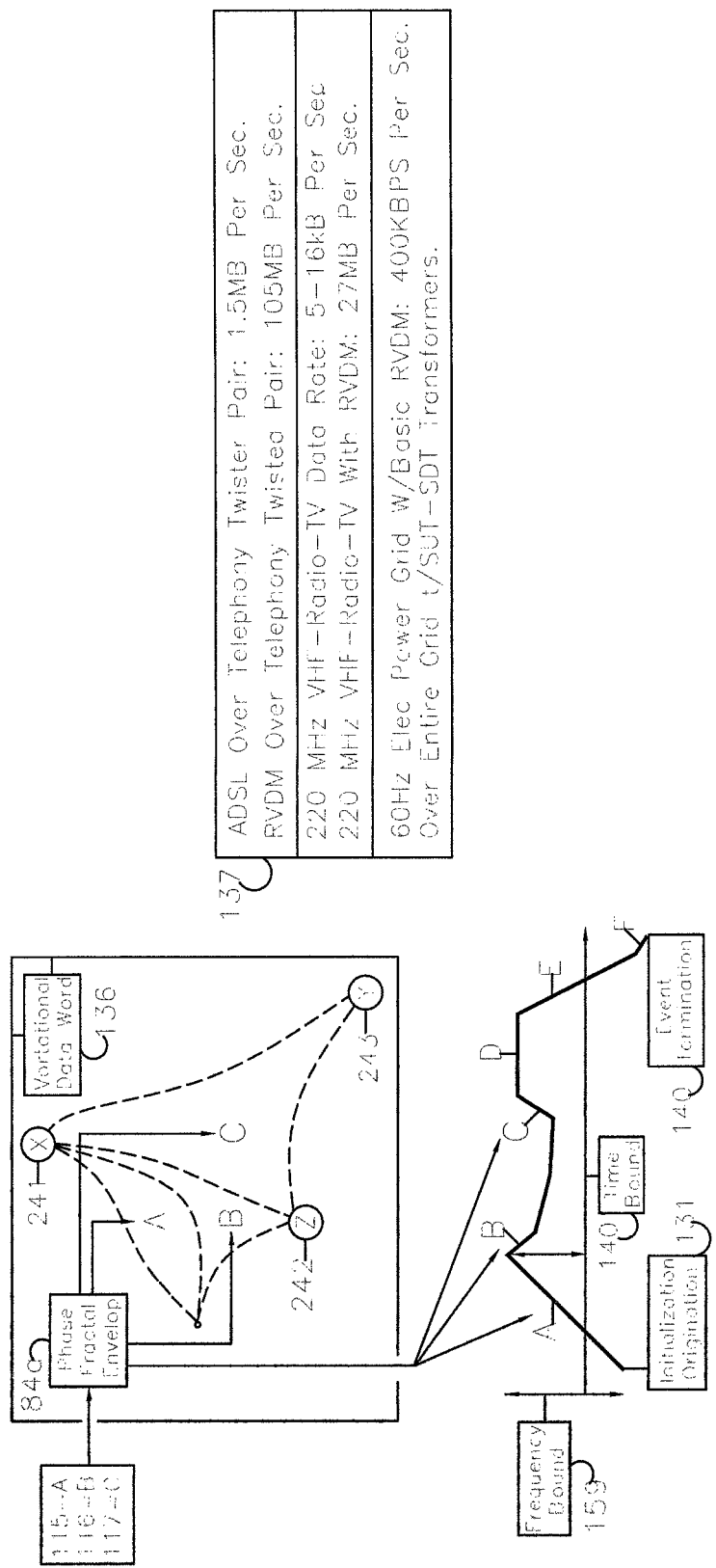
FIG. 6 depicts the vortational alphabet transcoding and performance comparison table, including performance metric, according to the invention.

The invention enables a dramatic increase in performance for data and voice communications over telephony twisted pair, wireless terrestrial radio and satellite communications data rates. Electrical power grid data communications have been up until now limited to broadband over power lines where additional radio carrier is added on the consumer side the step transformer shut. Referring to FIG. 6, depicted in this figure is an embodiment of the Resonant Vortational Divisional Multiplex (RVDM) modulation scheme performance table 137, summarized below.

- Conventional ADSL over Telephony twisted pair: 1.5 megabytes per second
- RVDM over Telephony twisted pair: 105 megabytes per second.
- Conventional 220 MHz VHF-Radio-TV data rate: 5-16 kB per second
- 220 MHz VHF-Radio-TV with RVDM: 27 mB per second
- 60 Hz Electrical power grid with basic RVDM: 400 kB per second over any grid, unimpeded by t/SUT-SDT transformers.

It should be noted that the foregoing performance improvement estimates are quite conservative.

Another novel form of a XYZ conductive vector is contemplated. The design includes a uniquely tuned Fresnel edged XYZ tri-layer pixel 253 which is layered with other XYZ pixels in graduated fashion such the as the tri-coil pattern. This design will lead to an associated tri-layer graduated pixel that will be used for visual displays and video cameras.

Additional objects and advantages will readily occur to those skilled in the art. The invention in its broader aspects is not limited to the specific details, methods, representative devices, and illustrative examples shown and described. Accordingly, departures may be made from such details without departing from the spirit or scope of the general inventive concept as defined by the appended claims and their equivalents. The examples provided herein are illustrative only, and are in no way meant to limit the invention.

What is claimed is:

1. A communications infrastructure, comprising:
   an energy transfer medium transmitting a sine wave of a first frequency; a first coil proximate the energy transfer medium;
   a power source coupled to the first coil to selectively charge the first coil with a first voltage of a first polarity in a first instance and then selectively charge the first coil with a second voltage of opposite polarity in a second instance to generate a first three dimensional spatial fractalized voltage sample, the first sample mapped to a symbol of a set of symbols and coded into the sine wave by virtue of the first coil being proximate the energy transfer medium;
   wherein further comprising a second coil proximate a distal end of the energy transfer medium, the second coil decoding the coded sample;
   wherein the power source is coupled to the second coil to selectively charge the second coil with a third voltage of a first polarity in a first instance and then selectively charge the second coil with a fourth voltage of a polarity opposite the third voltage in a second instance to generate another three dimensional spatial fractalized voltage sample, the other sample mapped to a second symbol of a set of symbols and coded into the sine wave by virtue of the second coil being proximate the energy transfer medium.

2. The communications infrastructure of claim 1, wherein coding the sample into the sine wave comprises modulating the sample into the sine wave at an offset to the sine wave.

3. The communications infrastructure of claim 1, further comprising a second coil proximate the energy transfer medium and the first coil, the second coil coupled to the power source to selectively charge the second coil with a voltage of a first polarity in a first instance and then selectively charge the second coil with a voltage of opposite polarity in a second instance to generate another three dimensional spatial fractalized voltage sample, the other sample mapped adjacent the first sample and encoded into the sine wave by virtue of the second coil being proximate the energy transfer medium and the first coil.

4. The communications infrastructure of claim 1, wherein the selective charges are programmatically controlled by a microprocessor.

\* \* \* \* \*